(12) United States Patent
Anzai

(10) Patent No.: US 9,646,403 B2
(45) Date of Patent: May 9, 2017

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shizuka Anzai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/834,668

(22) Filed: Aug. 25, 2015

(65) Prior Publication Data

US 2016/0071282 A1    Mar. 10, 2016

(30) Foreign Application Priority Data

Sep. 8, 2014    (JP) .................................. 2014-182503

(51) Int. Cl.
*G06F 9/34*      (2006.01)
*G06T 11/60*     (2006.01)
*H04N 19/80*     (2014.01)
*H04N 19/85*     (2014.01)
*H04N 19/59*     (2014.01)
*H04N 19/423*    (2014.01)

(52) U.S. Cl.
CPC .............. *G06T 11/60* (2013.01); *H04N 19/59* (2014.11); *H04N 19/80* (2014.11); *H04N 19/85* (2014.11); *H04N 19/423* (2014.11)

(58) Field of Classification Search
CPC ......... G06T 11/60; G06T 7/0079; G06T 9/00; G06T 11/00; H04N 19/423; H04N 19/59; H04N 19/80; H04N 19/85; H04N 19/20; H04N 19/649

USPC .................. 382/173, 232–233, 298–300
See application file for complete search history.

(56) References Cited

U.S. PATENT DOCUMENTS

| | | | | |
|---|---|---|---|---|
| 6,718,066 | B1 * | 4/2004 | Shen ..................... | H04N 19/61 375/E7.076 |
| 6,833,845 | B2 * | 12/2004 | Kitagawa ............. | H04N 19/186 345/611 |
| 8,305,495 | B2 | 11/2012 | Kegasawa | |
| 8,339,415 | B2 * | 12/2012 | Sekizawa ............. | G11B 27/034 345/619 |
| 8,526,752 | B2 * | 9/2013 | Lin ....................... | H04N 19/146 348/222.1 |
| 8,788,894 | B2 * | 7/2014 | Kang ................... | G06F 11/1048 714/723 |

(Continued)

FOREIGN PATENT DOCUMENTS

| | | |
|---|---|---|
| JP | 2010-226672 A | 10/2010 |
| JP | 2010-244184 A | 10/2010 |

*Primary Examiner* — Kanjibhai Patel
(74) *Attorney, Agent, or Firm* — Fitzpatrick, Cella, Harper & Scinto

(57) ABSTRACT

An image processing apparatus inputs an image and then reads out, from a memory, to perform image processing for an image of a second region of the input image, an image of a region superimposed on the second region, and an image of a part of a first region adjacent to the second region, and controls a position of padding, wherein the padding results from image reduction of the first region, performed before the image processing for the image of the second region, so that the padding that results from the image reduction of the first region is not read out for the image processing for the image of the second region.

8 Claims, 10 Drawing Sheets

(56) References Cited

U.S. PATENT DOCUMENTS 8,892,809 B2 * 11/2014 Yang ................ G06F 12/023
 709/247
2010/0253849 A1 10/2010 Kegasawa

* cited by examiner

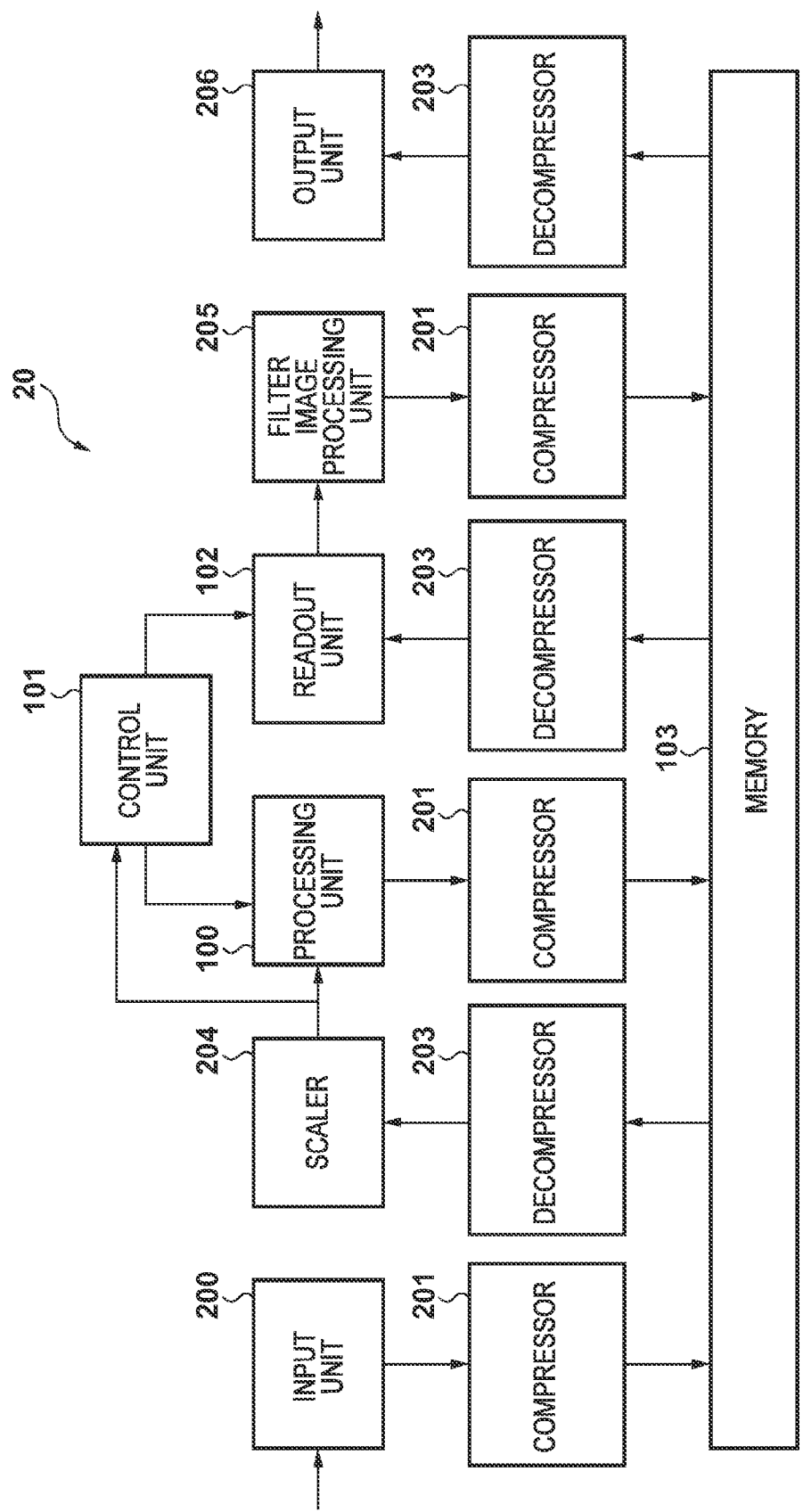

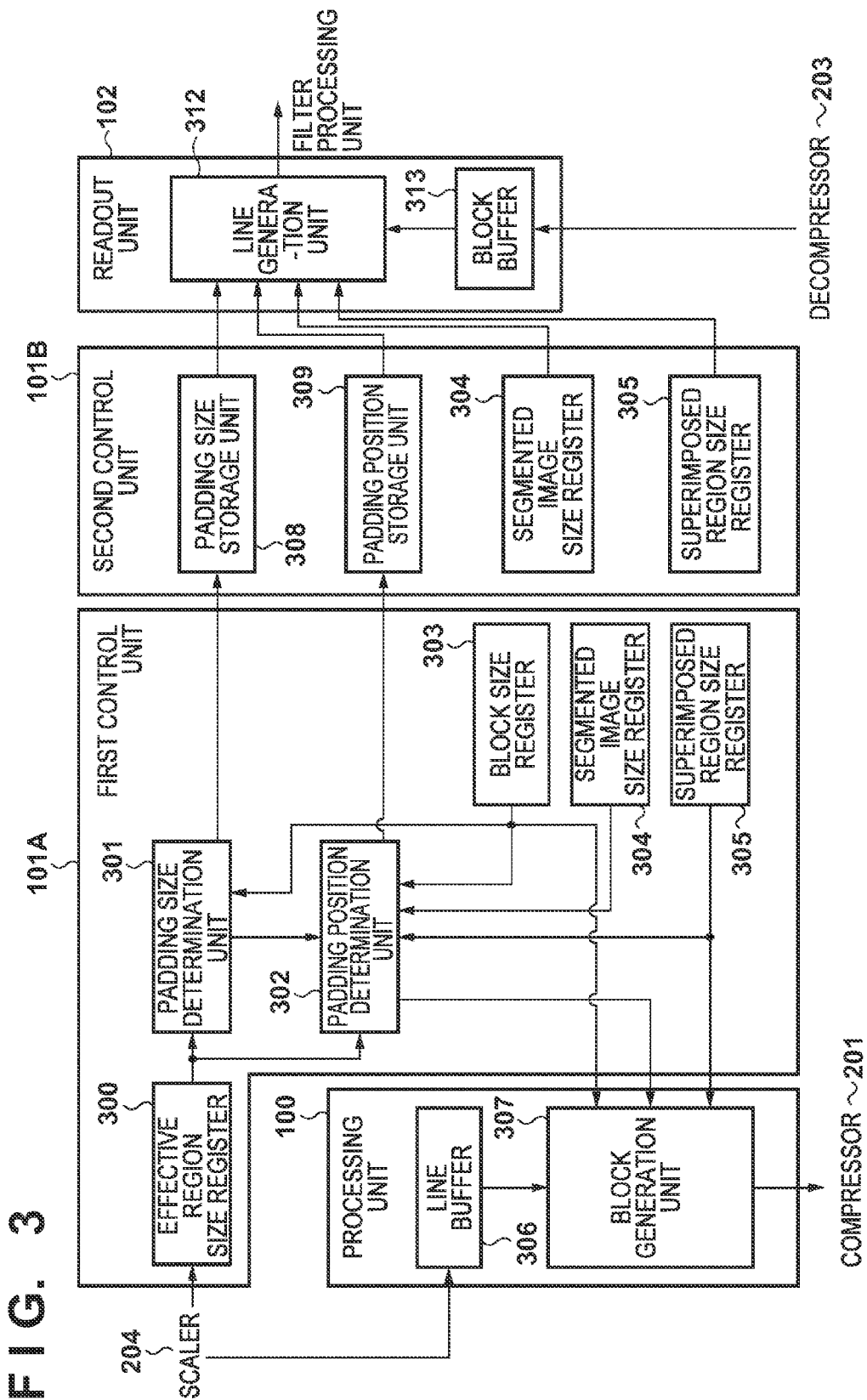

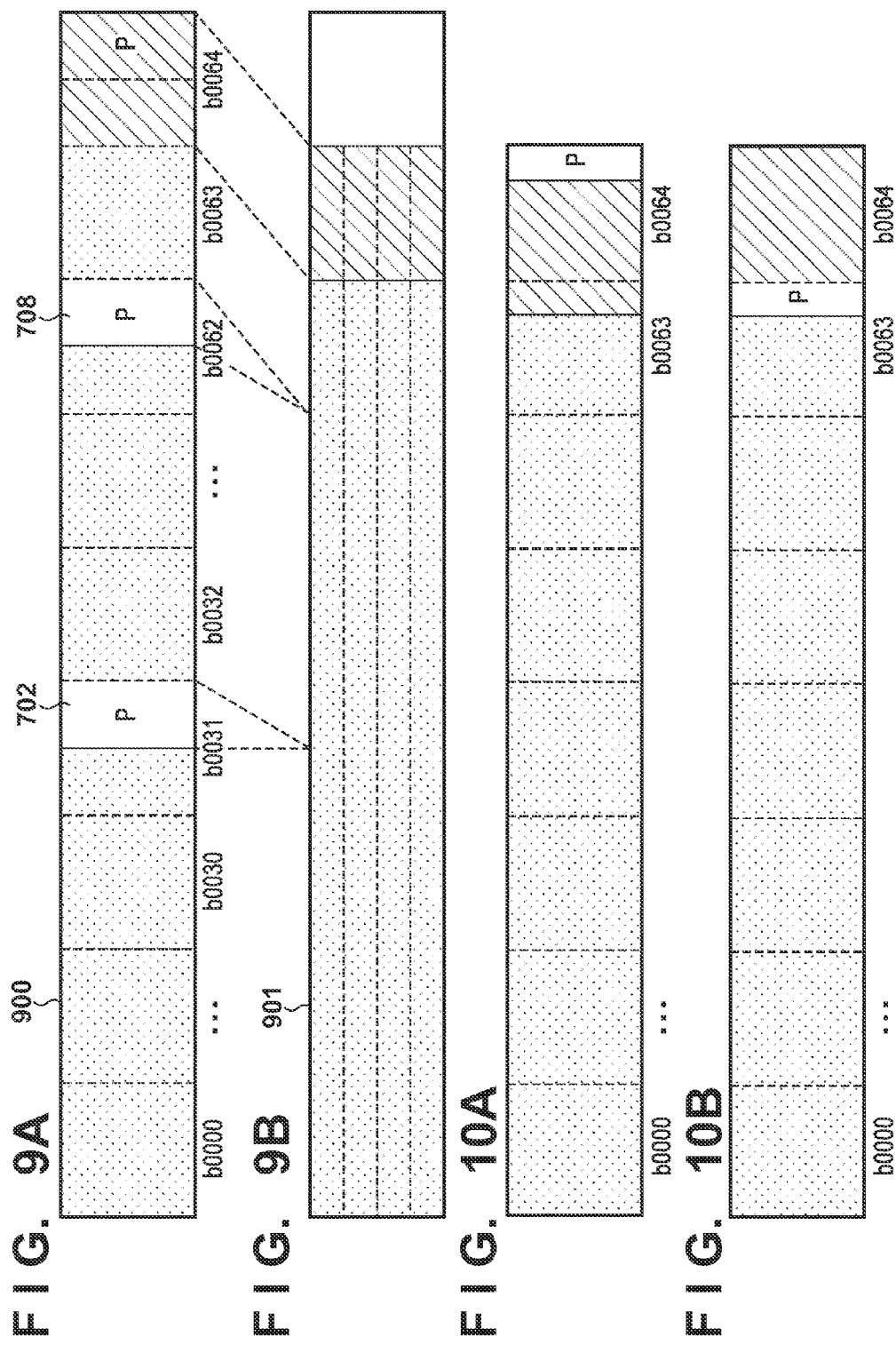

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique of processing a given image while referring to part of an image adjacent to the given image.

Description of the Related Art

Recently, there has been an active movement toward high-resolution videos such as 4K2K and 8K4K videos on televisions, liquid crystal projectors, displays, and the like. Such a video has a high pixel count and high color bit depth per image, and hence requires a very large band in the frame memory of an image processing apparatus. For this reason, methods of performing parallel processing upon segmenting an image into a plurality of regions and compressing/decompressing an image at the time of memory access have conventionally been used.

When one image is segmented into a plurality of segmented images and each segmented image is processed, a deterioration in image quality is caused by the loss of continuity of pixels on segment boundaries. For this reason, when processing segment boundaries, in addition to the above methods, there is often used a method of performing processing while referring to part (to be referred to as superimposed regions) of adjacent segmented images (Japanese Patent Laid-Open No. 2010-244184).

Japanese Patent Laid-Open No. 2010-226672 discloses a method of compressing, for each block, segmented images obtained by segmenting a 4K2K image into four regions for full HD display. If the size of each segmented image is not dividable with the size of each compressed block, a region not including a segmented image pixel (to be referred to as a padding region hereinafter) occurs in the compressed block generated at an end portion of a segmented image. When compressed blocks are generated, padding regions are generally filled with copied data (to be referred to as padding hereinafter) of blank pixels or end portion pixels. The method disclosed in Japanese Patent Laid-Open No. 2010-226672 reduces a band at the time of superimposed region readout by transferring pixels to fill a padding region from an adjacent segmented region in a blanking period during which no effective pixel is transferred.

When a given segmented image is processed by using another segmented image, the amount of image data read out for image processing may undesirably increase. Consider, for example, an image processing system which spatially segments one image, segments each segmented image into blocks (to be referred to as blocks or compressed blocks hereinafter) according to a compression processing unit with a predetermined size, and processes each segmented image. In this case, if each segmented image is not an integral multiple of the block size, it is necessary to insert padding into a block on an end portion of each segmented image. In this case, when the second segmented image is processed, padding is included in a compressed block to be read out from the first segmented image to refer to superimposed regions.

This operation will be described with reference to FIGS. 11A to 11G. FIGS. 11A to 11G are views for explaining that a compressed block read out from the first segmented image to refer to superimposed regions includes padding when the second segmented image is processed. FIG. 11A shows an image before segmentation. Referring to FIG. 11B, blocks b0000 to b0003 correspond to a first segmented image T00, and blocks b0004 to b0007 correspond to a second segmented image T01. In this case, when the first segmented image T00 is processed, the block b0004 is read out as a superimposed region together with the first segmented image T00 and the blocks b0000 to b0004 are processed to prevent a deterioration in image quality caused by the loss of the continuity of pixels on a segment boundary. Likewise, when the second segmented image 101 is processed, the blocks b0003 to b0007 are read out. Note that when the second segmented image 101 is processed, blocks of the segmented image on the right of the second segmented image 101 are also referred to. However, a description of this operation will be omitted.

When each segmented image is to be processed upon reduction, reduction processing is performed for the first segmented image T00 (the blocks b0000 to b0003) shown in FIG. 11C to obtain a first reduced segmented image T10 as shown in FIG. 11D. Subsequently, when the image data is cut out for each block to perform image processing, padding is inserted in part of a block b0013, as shown in FIG. 11E. When reduction processing and padding insertion are performed for all the segmented images, the resultant image data becomes like that shown in FIG. 11F. At the time of image processing, superimposed regions adjacent to data as described above are read out together. When a second reduced segmented region T11 (blocks b0014 to b0017) are to be read out, blocks b0012 and b0013 are read out as superimposed regions together with the blocks b0014 to b0017. As described above, when no reduction processing is performed, one block is read out as a superimposed region, as shown in FIG. 11B. In contrast to this, when reduction processing is performed, the two blocks b0012 and b0013 are readout superimposed regions.

That is, letting N(p) be the number of compressed blocks of the first segmented image, which include padding and superimposed regions which are referred to from the second segmented region, N(p) is represented by:

$$N(p)=\text{roundup}((\text{padding size}+\text{superimposed region size})/(\text{compressed block size}))$$

where roundup indicates the rounding up of the value inside the parentheses to an integer. In addition, "size" is a one-dimensional size in a direction at a right angle with respect to a region boundary. On the other hand, letting N be the number of compressed blocks simply including superimposed regions to be referred to from the second segmented region, N is represented by:

$$N=\text{roundup}(\text{superimposed region size}/\text{compressed block size})$$

In this case, if the relation between the two numbers N(p) and N of compressed blocks satisfies N(p)>N, adding padding will increase the number of compressed blocks to be read out to refer to superimposed regions. This leads to the problem that the band increases at the time of superimposed region readout.

SUMMARY OF THE INVENTION

The present invention has been made in consideration of the above problem, and provides a technique of reducing the data amount of image data read out when performing image processing upon reading out adjacent images.

According to one aspect of the present invention, there is provided an image processing apparatus which comprises:

an image processing unit configured to read out part of an image of a first partial region of an input image and an image of a second partial region adjacent to the first partial region to perform image processing for the image of the second partial region; and a control unit configured to control a position of padding, which is occurred by the image processing for the image of the first partial region which is performed before image processing for the image of the second partial region by the image processing unit, so that the padding is not read out for image processing for the image of the second partial region.

Further features of the present invention will become apparent from the following description of exemplary embodiments (with reference to the attached drawings).

BRIEF DESCRIPTION OF THE DRAWINGS

FIG. 2 is a block diagram showing the arrangement of an image processing system using the image processing apparatus according to the first embodiment;

FIG. 3 is a block diagram showing the detailed arrangement of the image processing apparatus according to the first embodiment;

FIGS. 9A and 9B are views showing intra-buffer data at the time of padding deletion in the H direction;

FIGS. 10A and 10B are views showing intra-buffer data at the time of padding movement in the H direction when performing enlargement processing.

DESCRIPTION OF THE EMBODIMENTS

First Embodiment

Figure 1:
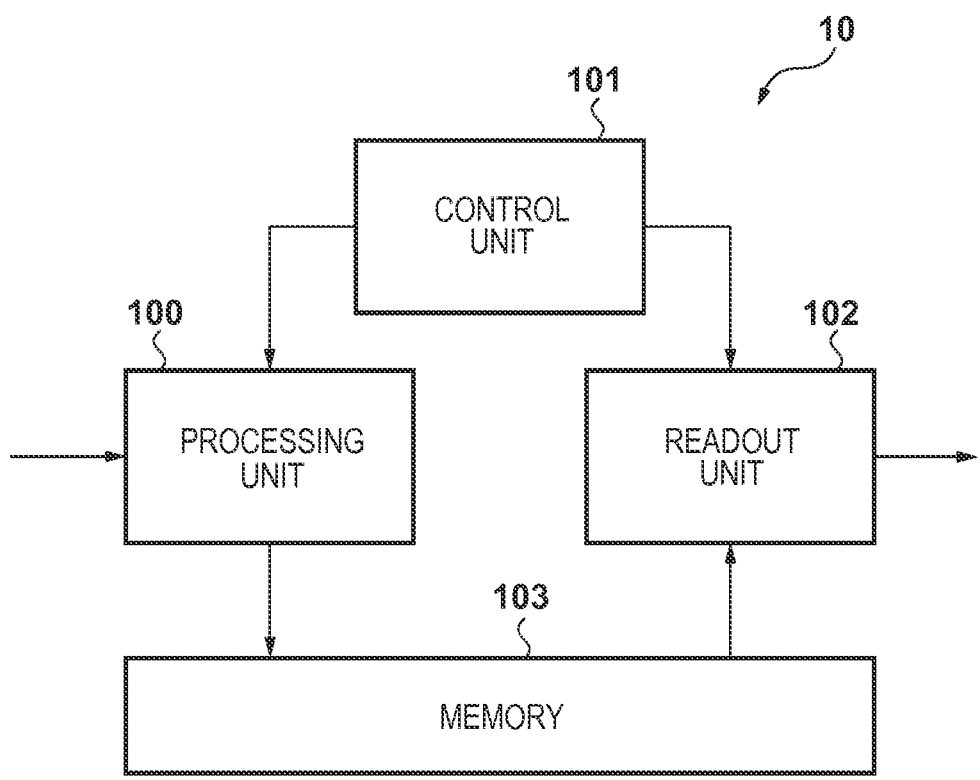
FIG. 1 is a block diagram showing the arrangement of an image processing apparatus according to the first embodiment.

The arrangement of an image processing apparatus according to the first embodiment will be described with reference to FIGS. 1 and 2. FIG. 1 is a block diagram showing the arrangement of an image processing apparatus 10 according to this embodiment. The image processing apparatus 10 according to the embodiment includes a processing unit 100, a readout unit 102, a memory 103, and a control unit 101 which controls the processing unit 100 and the readout unit 102.

FIG. 2 is a block diagram showing the arrangement of an image processing system 20 according to this embodiment which uses the image processing apparatus 10 shown in FIG. 1. Note that the same reference numerals as in FIG. 1 denote the same modules in FIG. 2. The image processing system 20 according to the embodiment includes an input unit 200, an output unit 206, a scaler 204, a filter image processing unit 205, the image processing apparatus 10 (100, 101, 102, and 103), and a compressor 201 and a decompressor 203 which compress/decompress data at the time of memory access.

An outline of each module and a data flow shown in FIG. 2 will be described next. The input unit 200 generates block data from the line data of an input image based on the compressed block size handled by the compressor 201, and inputs the generated data to the compressor 201. The compressor 201 is a compression circuit which performs compression for each block of 8×8 pixels, and is, for example, a JPEG compression circuit. The compressor 201 compresses input block data for each block and stores the resultant data in the memory 103. For this reason, data is written in and read out from the memory 103 for each compressed block. The compression scheme to be used is not limited to any specific scheme such as the JPEG compression scheme, and any scheme designed to perform compression for each block can be used. In addition, this embodiment is assumed to use a compressor, but is not limited to compression. For example, it is possible to use a packet generation circuit which forms input data into a packet for each block. The decompressor 203 converts the compressed data stored in the memory 103 into the original block data by decompressing the data, and inputs the block data to subsequent modules (the scaler 204, the readout unit 102, and the output unit 206).

Figure 4A:
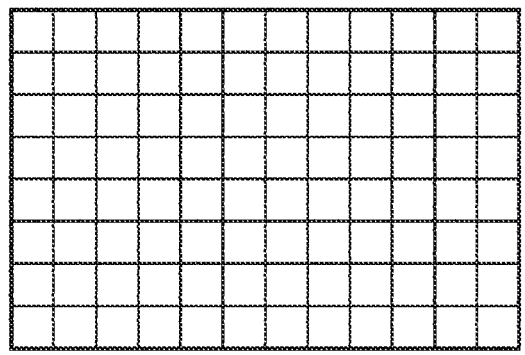
FIGS. 4A to 4D are views for explaining the memory mapping of data and a readout method.
Figure 4B:
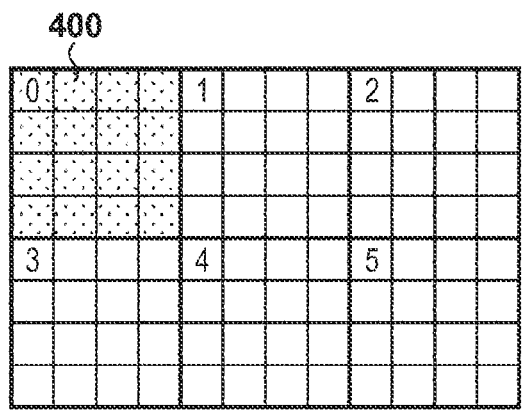

The scaler 204 enlarges/reduces the block data input from the decompressor 203 and inputs the resultant data to the processing unit 100. A data readout method at the time of scaler processing executed by the scaler 204 will be described with reference to FIGS. 4A to 4D. FIGS. 4A to 4D are views for explaining the memory mapping of data and the readout method according to this embodiment. FIG. 4A is a view showing compressed data arrangement in the memory before data is read out to the scaler 204. Pixels corresponding to one frame are segmented in a lattice pattern for each compressed block and are arranged in the memory in a compressed state. FIG. 4B shows a data range in the memory in which data is read out by the scaler 204. The scaler 204 reads out a region image unit 400 (to be referred to as a segmented image hereinafter) having a size n times the compressed block size, and performs enlargement/reduction processing. In the embodiment, as shown in FIG. 4B, one frame is segmented into six images. After processing segmented image 0 (400), the scaler 204 processes adjacent segmented image 1, and then processes segmented image 2, thus performing processing up to segmented image 5. Processing all the segmented images will complete the processing for the entire one frame. Performing processing for each segmented image in this manner allows the scaler 204 to decrease the length of the internal line buffer to the line length of each segmented image. This can reduce the buffer capacity as compared with a case in which processing is performed for each frame.

The processing unit 100 performs the data processing of generating block data again from segmented images after scaler processing, and inputs the resultant data to the compressor 201. Upon determining that it is necessary to add padding at the time of block generation by enlargement/reduction processing by the scaler 204, the processing unit 100 generates padding at the positions based on control of the control unit 101. Padding in this embodiment is data representing blank pixels. However, padding to be used is not limited to this case and may be any data which represents pixel data added to pixel data before block generation. The readout unit 102 reads out block data upon addition of superimposed regions to segmented images for the filter image processing unit 205 on the subsequent stage.

Figure 4C:
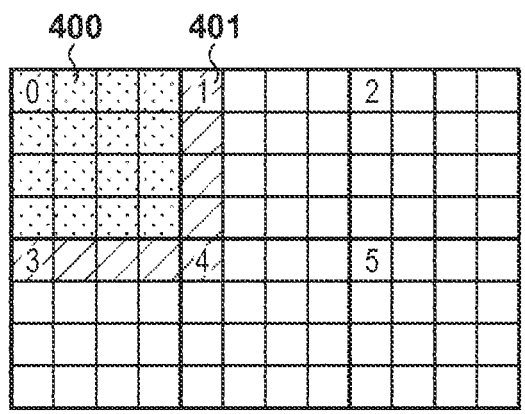

The data readout method used by the readout unit 102 will be described. FIG. 4C shows a data range on the memory in which the readout unit 102 reads out data. In this case, the segmented image 400 is constituted by 4×4=16 block data. A region 401 as the hatched portion which is part of the segmented image and located around the segmented image is a region (to be referred to as a superimposed region hereinafter) necessary for filter processing for the end portion pixels of the segmented image 400. In the case of the segmented image 400, the superimposed region includes nine blocks on the right end and the lower end. The readout unit 102 reads out an image region (to be referred to as an extended segmented image hereinafter) as the sum of the segmented image 400 and the superimposed region 401. In this case, the extended segmented image is constituted by 5 (vertical)×5 (horizontal)=25 blocks.

Figure 4D:
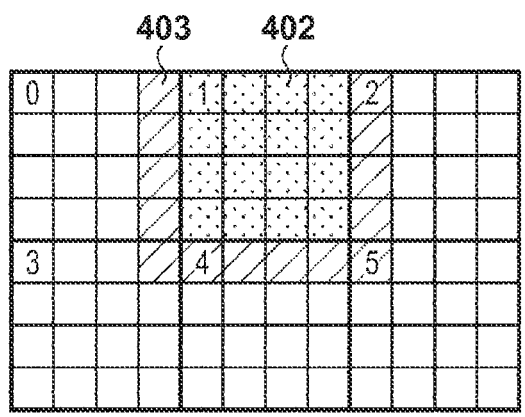

FIG. 4D shows how another segmented image 402 is read out by the readout unit 102. In this case, a superimposed region 403 is added to the right end, left end, and lower end of the segmented image 402. Adding the superimposed region will hold the continuity of image processing on segment boundaries. This can therefore produce the effect of solving the problem of a deterioration in image quality on the segment boundaries. As in the case of scaler processing by the scaler 204, the filter image processing unit 205 completes filter processing for the entire one frame by sequentially processing all the extended segmented images. The readout unit 102 deletes padding from each block data read out in the above manner under the control of the control unit 101. The readout unit 102 then combines the remaining pixels to generate line data, and inputs the data to the filter image processing unit 205.

The filter image processing unit 205 executes filter processing for the input line data to generate blocks again from the line data, and inputs the blocks to the compressor 201. The output unit 206 generates line data from the block data input via the memory 103 and the decompressor 203, combines the segmented images into one frame, and outputs it to a display device (not shown).

The detailed arrangements of the processing unit 100, the control unit 101, and the readout unit 102 as features of this embodiment will be described next with reference to FIG. 3. FIG. 3 is a block diagram showing the detailed arrangement of the image processing apparatus 10 according to the embodiment. The same reference numerals as in FIG. 1 denote the same modules in FIG. 3. The control unit 101 is constituted by a first control unit 101A which controls padding generation by the processing unit 100 and a second control unit 101B which controls padding deletion by the readout unit 102.

The first control unit 101A is constituted by an effective region size register 300, a block size register 303, a segmented image size register 304, a superimposed region size register 305, a padding size determination unit 301, and a padding position determination unit 302. The effective region size register 300 stores pixel counts in the H (Horizontal) direction and the V (Vertical) direction as the effective region size of line data after enlargement/reduction processing, which is input from the scaler 204. The block size register 303 stores pixel counts in the H direction and the V direction as the size of a compressed block. The segmented image size register 304 stores pixel counts in the H direction and the V direction as the size of a segmented image. The superimposed region size register 305 stores pixel counts in the H direction and the V direction as the size of a superimposed region. Note that specified values are set in these registers before the execution of block generation by the processing unit 100.

The padding size determination unit 301 calculates the sizes of padding in the H and V directions in terms of pixel counts based on an effective region size and a block size. The padding position determination unit 302 calculates positions in the H and V directions in terms of pixel counts for the generation of padding in the line data stored in a line buffer 306 based on an effective region size, a superimposed region size, a segmented region size, a block size, and a padding size.

The respective register values, counter values, padding sizes, and padding positions in the first control unit 101A are updated at the start of processing for segmented images by the scaler 204. The updated data are input to the second control unit 101B, together with segmented image IDs as the identifiers of the segmented images. The segmented image IDs are consecutive numbers starting from 0, which are set in the order of reduction/enlargement processing by the scaler 204. These IDs are input to the second control unit 101B and added as headers to the compressed data of the segmented images. FIG. 4B shows an example of segmented image IDs. The ID of the segmented image 400 is 0, and the ID of the segmented image to be processed next, which is adjacent to the right of the segmented image 400, is 1. Linking the segmented image ID to the padding information of the corresponding segmented image enables the generation of line data in a proper order even when the readout order of segmented images is changed by the filter image processing unit 205.

The processing unit 100 is constituted by the line buffer 306 and a block generation unit 307. The line buffer 306 is a buffer which stores the line data having undergone enlargement/reduction processing and input from the scaler 204. The line buffer 306 has buffers, each corresponding to the line length of a segmented region read out by the scaler 204, which are equal in number to the pixel count as the compressed block size in the V direction. The block generation unit 307 generates block data as image data from the line data stored in the line buffer 306 based on the compressed block size input from the first control unit 101A. In the line buffer 306, input line data are arranged in a left-aligned state. The block generation unit 307 generates a block while shifting from the left to the right, with the pixel on the left end being the start pixel. Before the generation of a block, the block generation unit 307 receives a padding size, a padding generation position, padding movement information, and a superimposed region size from the first control unit 101A. The block generation unit 307 generates padding by changing the data arrangement in the line buffer 306 based on these pieces of input information.

The second control unit 101B is constituted by a padding size storage unit 308, a padding position storage unit 309, a superimposed region size register 305, and a segmented image size register 304. The superimposed region size register 305 and the segmented image size register 304 of the second control unit 101B are those identical to the superimposed region size register 305 and the segmented image size register 304 of the first control unit 101A, which are implemented for the readout unit.

The padding size storage unit 308 stores the padding size calculated by the padding size determination unit 301 of the first control unit 101A, together with a segmented image ID. The padding size storage unit 308 then inputs, to the readout unit 102, the padding size of a segmented image matching the segmented image ID read out by the readout unit 102. The padding position storage unit 309 stores the padding position calculated by the padding position determination unit 302 of the first control unit 101A, together with the ID of the segmented image. The padding position storage unit 309 then inputs, to the readout unit 102, the padding position of the segmented image matching the segmented image ID read out by the readout unit 102. Note that the respective register values, counter values, padding sizes, and padding positions in the second control unit 101B are updated at the start of filter processing for the segmented images by the filter image processing unit 205.

The readout unit 102 is constituted by a block buffer 313 and a line generation unit 312. The block buffer 313 is a buffer which stores the block data read out from the memory 103 and decompressed by the decompressor 203. The block buffer 313 includes buffers equal in number to the blocks of the extended segmented image read out by the readout unit 102 in the H direction, with the size of each buffer being equal to the compressed block size. The line generation unit 312 generates line data from data in the block buffer 313. When generating line data, the line generation unit 312 deletes padding from block data based on the padding size and the padding position input from the second control unit 101B.

The operation flowchart of the image processing apparatus 10 according to this embodiment will be described next with reference to the flowcharts of FIGS. 5 and 6. Assume that in this embodiment, the resolution of an input image is 4096×2160, the compressed block size is set to 8 pixels×8 pixels, the segmented region size is set to 512 pixels×512 pixels, the extended segmented image size is set to 520 pixels×520 pixels, and the resolution of the input image is reduced to 2016 pixels×1062 pixels.

Figure 5:
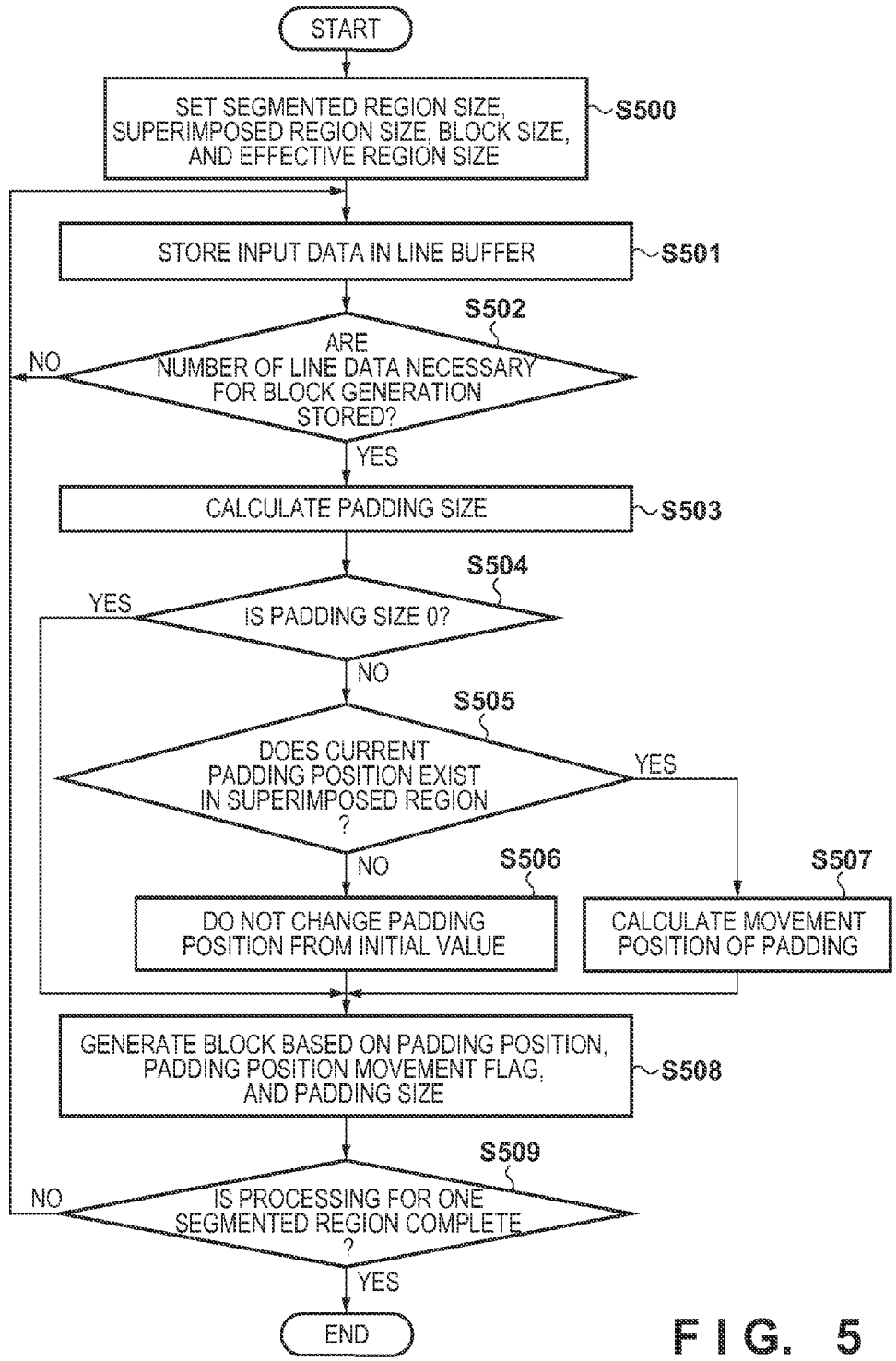
FIG. 5 is an operation flowchart at the time of padding generation.

FIG. 5 is an operation flowchart for padding generation control by the first control unit 101A and block generation by the processing unit 100. Before the scaler 204 starts an input operation to the image processing apparatus 10, a segmented region size, a superimposed region size, and a block size are set in the respective registers (step S500). Note that in the following description, the suffix "V" indicates a value in the vertical direction, and the suffix "H" indicates a value in the horizontal direction. In this embodiment, block size H=8, block size V=8, segmented image size H=512, segmented image size V=512, superimposed region size H=8, and superimposed region size V=8. A segmented region having a size of 512×512 is read out for scaler processing. In this embodiment, the scaler 204 reduces the segmented region with a size of 512×512 to a region with a size of 252×252 to reduce the data of a region with a size of 4096×2160 to the data of a region with a size of 2016×1062. For this purpose, effective region size H=252 and effective region size V=252 (step S500).

The processing unit 100 stores the input line data in the line buffer 306 (step S501), and determines whether the number of lines stored in the line buffer 306 has reached a line count necessary for the generation of a block (step S502). Step S501 is repeated until the number of lines stored in the line buffer 306 reaches the line count necessary for block generation (step S502: NO→Step S501). In this embodiment, since block size V=8, data corresponding to eight lines are stored in the line buffer 306, because block size V=8.

Figure 7A:
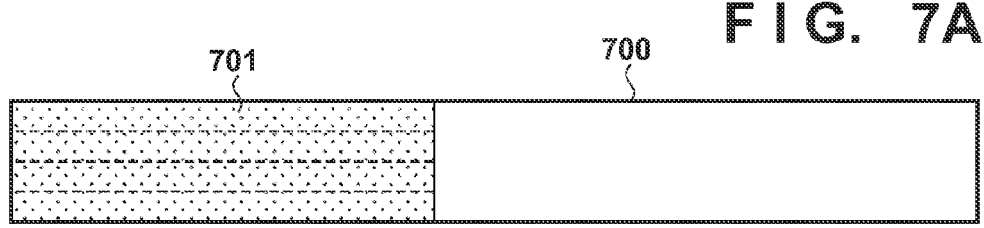
FIGS. 7A to 7D are views showing intra-buffer data at the time of padding movement in the H direction.

FIGS. 7A to 7D each show a data arrangement in the line buffer 306 at the time of processing in the H direction. FIG. 7A shows the data arrangement in the line buffer 306 when line data corresponding to eight lines are stored in the buffer (step S502). A region 700 is a region for data which can be arranged in the line buffer 306. In the case shown in FIG. 7A, data with a size of 512×8 can be stored. Line data with a size of 252×8 (701: a filled region) after reduction processing is stored as shown in FIG. 7A. If necessary line data is stored in the line buffer 306 (YES in step S502), the padding size determination unit 301 calculates padding sizes in the H and V directions of the data stored in the line buffer (step S503). Padding sizes are calculated based on the following equations:

$$\text{padding size } H = \text{effective region size } H \,\%\, \text{block size } H$$

$$\text{padding size } V = \text{effective region size } V \,\%\, \text{block size } V$$

That is, padding sizes are calculated such that each effective region size becomes an integer multiple of the block size. In this embodiment, since both the effective region sizes in the H and V directions are 252 and the block size is 8, padding size H=4 and padding size V=4.

If both the padding size H and the padding size V are 0 (the effective region size is dividable with the block size), there is no need to insert padding into line data. For this reason, padding position calculation processing (steps S505, S506, and S507) is omitted (YES in step S504). If the padding size is not 0 (that is, the effective region size is not dividable with the block size) (NO in step S504), the final pixel in the effective region exists in a place other than the right end and lower end of the final block of the line data in the H and V directions.

Figure 7B:
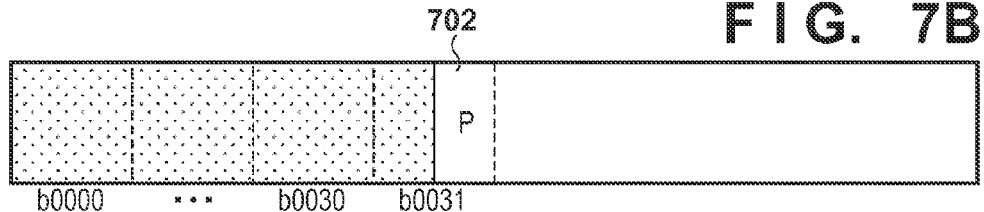

Padding in the H direction will be described with reference to FIG. 7B. FIG. 7B shows a segment pattern (broken lines) in a case in which a plurality of blocks are generated from line data 701 in the line buffer 306. The line data 701 are stored in the line buffer 306 such that eight lines of 252 pixels #0 to #251 (#0 indicates the 0th pixel, that is, the start pixel) are stored in a left-aligned state. Thirty-two blocks b0000 to b0031 with a size of 8×8 are generated from the line data. In a block B0031, since the effective pixels end with the pixel #251, padding in the H direction is inserted in the remaining region with a size of 4×8 (702: a blank region denoted by reference symbol P) to generate a block. The boundary between the effective region and the padding in the block b0031 is the initial value of the padding position.

Figure 8A:
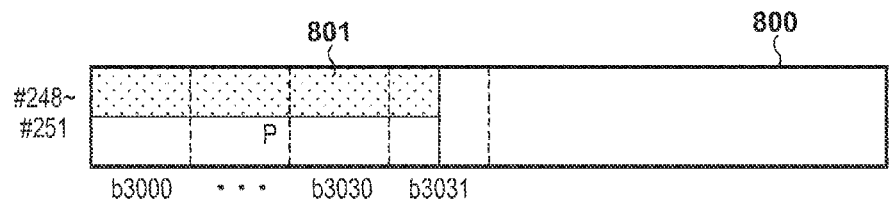
FIGS. 8A to 8C are views showing intra-buffer data at the time of padding movement in the V direction.
Figure 8B:
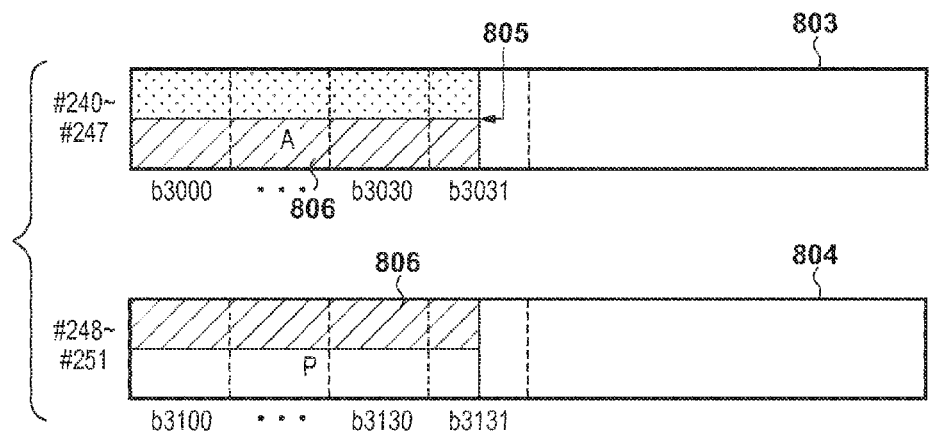
Figure 8C:
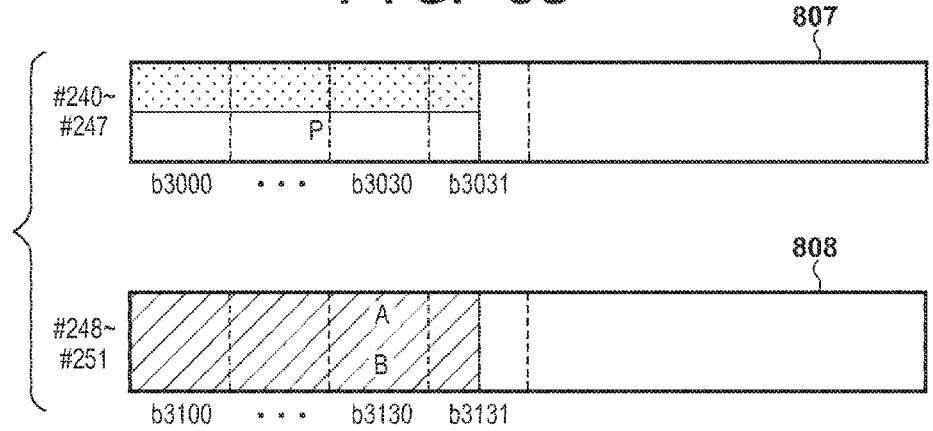
Figure 11A:
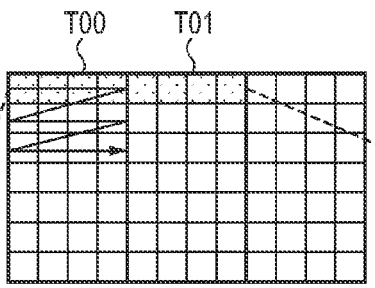
FIGS. 11A to 11G are views for explaining a related art.
Figure 11B:
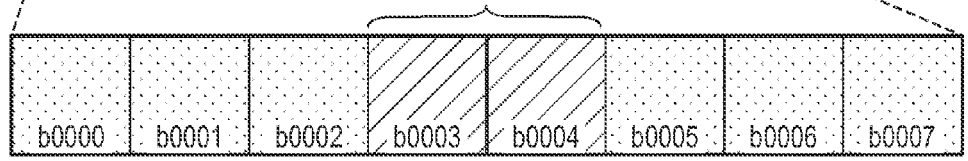
Figure 11C:
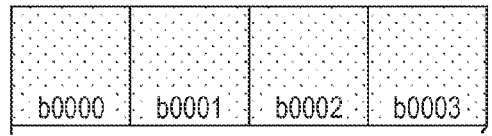
Figure 11D:
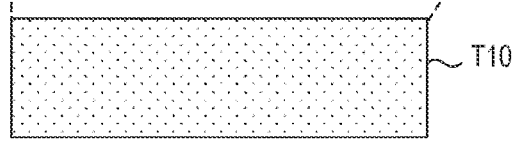
Figure 11E:
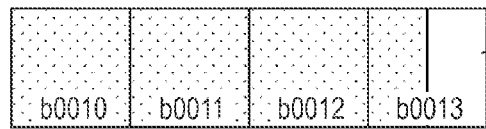
Figure 11F:
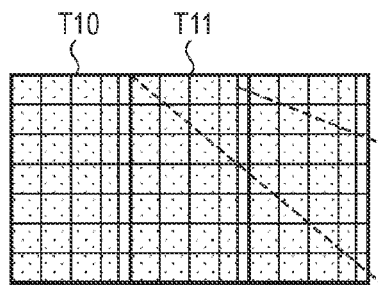
Figure 11G:
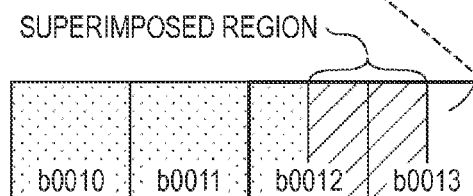

FIGS. 8A to 8C each show a data arrangement in the line buffer 306 at the time of each type of processing in the V direction. Padding in the V direction will be described with reference to FIG. 8A. FIG. 8A shows a segment pattern (broken lines) in a case in which a plurality of blocks are generated from line data 801 in the line buffer 306. A region 800 is a region in which data can be arranged in the line buffer 306. In the case shown in FIG. 8A, of lines #0 to #251 (#0 indicates the 0th line, that is, the start line) of a segmented image after reduction to a size of 252×252, lines #248 to #251 (801: a filled region) constituting the final block in the V direction are stored. In this case, since the final line of the effective region is #251, padding in the V direction is inserted in the remaining region with a size of 252×4 (802: a blank region denoted by reference symbol P) to generate a block. The boundary between the effective region of the blocks b3000 to b3031 and the padding is the initial value of the padding position.

The padding position determination unit 302 determines whether the current padding position (that is, the padding position in the final block) exists in the superimposed region which is referred to by an adjacent segmented image (step S505). The padding position determination unit 302 performs this determination in the following manner. First of all, the padding position determination unit 302 calculates the respective block counts by:

superimposed region block count H=roundup (superimposed region size H/block size H)

effective region block count H=roundup (effective region size H/block size H)

segmented image block count H=segmented region size H/block size H superimposed region block count V=roundup (superimposed region size V/block size V)

effective region block count V=roundup (effective region size V/block size V)

segmented image block count V=segmented region size V/block size V where roundup indicates the rounding up of the value inside the parentheses to an integer.

If effective region block count+superimposed region block count>segmented image block count, since it indicates a state in which the effective region block overlaps the block corresponding to the superimposed region, the padding position determination unit 302 determines that the current padding position exists in the superimposed region. In contrast to this, if effective region block count+superimposed region block count≤segmented image block count, the padding position determination unit 302 determines that the current padding position is not included in the superimposed region. In this case, the padding position determination unit 302 does not change the initial value of the padding position (step S506). The padding position determination unit 302 then holds the effective region block count H, and adds it to the effective region block count H calculated in step S505 in the line buffer 306 at the time of reduction processing for the next segmented region. The padding position determination unit 302 also performs the same processing in the V direction. In this manner, the padding position determination unit 302 detects a case in which the padding position exists in a superimposed region as a result of the reduction of a plurality of segmented regions.

In this embodiment, under the above conditions, segmented image block count H=512 (segmented image size H)/8 (block size H)=64, segmented image block count V=512 (segmented image size V)/8 (block size V)=64, superimposed region block count H=8 (superimposed region size H)/8 (block size H) 8=1, superimposed region block count V=8 (superimposed region size V)/8 (block size V) 8=1, effective region block count H=32, and effective region block count V=32. If segmented images are arranged as shown in FIGS. 4B to 4D, 32 blocks b0000 to b0031 are generated from the line data after reduction processing for segmented image 0, as shown in FIG. 7B. In this case, since the effective region block count is 32, and the superimposed region block count is 1, the sum is smaller than a segmented image block count of 64. The padding position determination unit 302 therefore determines that the position of the padding (702) does not exist in the superimposed region. The padding position determination unit 302 holds 32 as the effective region block count, and adds it to the effective region block count of the line data of segmented image 1 to be processed next after reduction processing.

Figure 7C:
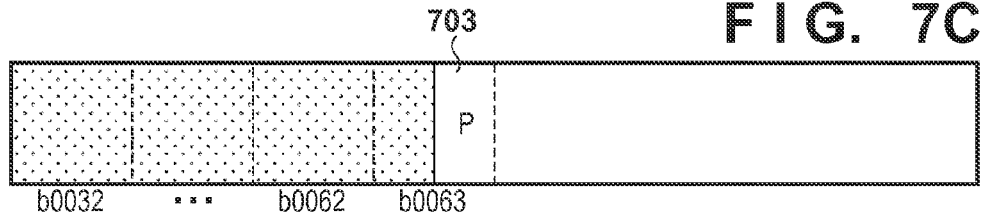

FIG. 7C shows a block segment image of line data after reduction processing for segmented region 1. Thirty-two blocks b0032 to b0064 are generated from the line data of segmented region 1 after reduction processing as in the case of the processing for segmented region 0. In the final block B0064, a padding region (703: a blank region denoted by reference symbol P) is generated. At the time of determination on segmented region 1 in step S505, since the effective region block count in segmented region 0 which has been held is added to the effective region block count in segmented region 1, the effective region block count is 64. In this case, since the effective region block count is 64 and the superimposed region block count is 1, the sum exceeds a segmented image block count of 64. Therefore, the padding position determination unit 302 determines that the position of padding (703) exists in the superimposed region. The padding position determination unit 302 determines whether padding in the V direction exists in the superimposed region as well as padding in the H direction.

Upon determining that the padding position exists in the superimposed region (YES in step S505), the padding position determination unit 302 calculates the destination position of the padding to move the padding outside the superimposed region (step S507). The padding position determination unit 302 calculates padding positions based on the following equations:

padding position H=effective region size H−superimposed region size H+1 padding position V=effective region size V−superimposed region size V+1

That is, the padding position is set to the start position of the superimposed region included in the data stored in the line buffer. The padding position determination unit 302 inputs the calculated padding position to the block generation unit 307, together with a flag signal indicating that the padding position has been changed. In this embodiment, the padding insertion position in the H direction coincides with the start position of pixel #244 of pixels #0 to #251 arranged in the line buffer. Likewise, the padding insertion position in the V direction coincides with the start position of line #244.

Figure 7D:
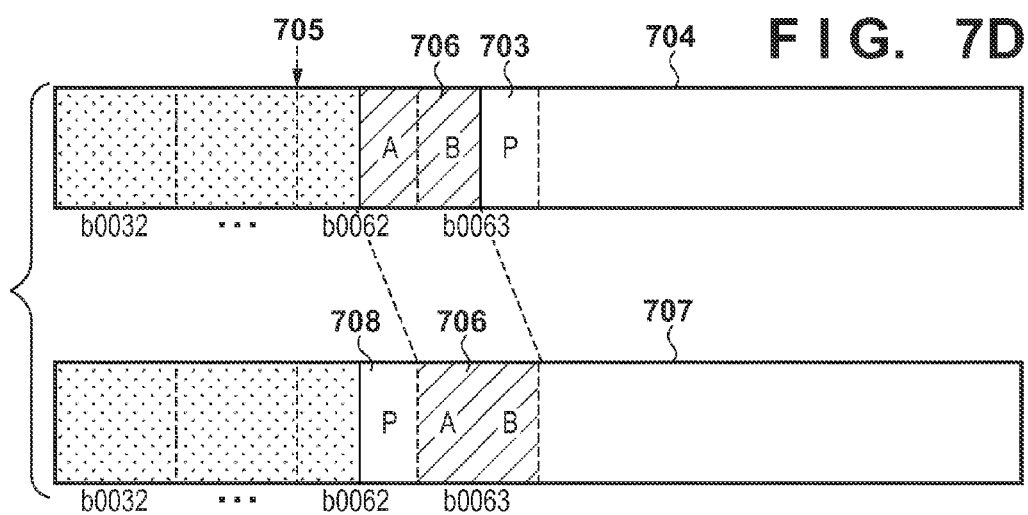

FIG. 7D shows a padding position (705) in the H direction in this embodiment. The upper view (704) of FIG. 7D indicates a data arrangement in the line buffer 306 before the movement of a padding region. This line data includes a superimposed region (706: hatched regions A and B) which is referred to from another segmented region. The superimposed region includes eight pixels from the right end, and hence lies astride four pixels (706: hatched region A) on the block b0062 side and the block b0063 (706: hatched region B). The padding position (705) becomes the start position of the superimposed region, and hence becomes the boundary between the non-superimposed region of the block b0062 and superimposed region A.

FIG. 8B shows a padding position (805) in the V direction in this embodiment. The upper view (803) and the lower view (804) of FIG. 8B show a data arrangement in the line buffer 306 before a padding region is moved. The upper view (803) shows a data arrangement in the line buffer with respect to lines #240 to #247. The lower view (804) shows the data arrangement of the line buffer with respect to lines #248 to #251. A superimposed region V (806: hatched region) includes eight pixels from the lower end, and hence lies astride four lines (806: hatched region B) of lines #240 to #247 and four lines (806: hatched region B) of lines #248 to #251. The padding position (805) becomes the start position of the superimposed region, and hence becomes the boundary between the non-superimposed region and superimposed region A of each block data formed from lines #240 to #247.

When a padding position is determined, the block generation unit 307 generates padding based on the padding size and the padding position, and generates block data from line data (step S508). If the padding size is 0 (YES in step S504), since there is no need to insert padding at the time of generation of blocks, the block generation unit 307 segments the data in the buffer from the left end to generate block data.

If the padding size is not 0 and the padding position is not moved (NO in steps S505 and S506), the block generation unit 307 generates block data by inserting padding pixels corresponding to the padding size from the padding initial position in the final block generated from the line data. That is, the padding (702) in FIG. 7B is inserted in the H direction, and the padding (802) in FIG. 8A is inserted in the V direction, thereby generating block data.

If the padding size is not 0 and the padding position is moved (YES in steps S505, and S507), the block generation unit 307 calculates first the start pixel position of a superimposed region when a block corresponding to the superimposed region is generated from the end of an effective region. The block generation unit 307 then copies data corresponding to the superimposed region block to the position shifted from the start position by the padding size.

FIG. 7D shows a data arrangement in the line buffer 306 after the padding position is moved in the H direction in the lower view (707). In this embodiment, the start position of a superimposed region block becomes the start position (705) of superimposed region A. Data (706) corresponding to the superimposed region block is copied to the position shifted from the start position by the padding size H (four pixels). The segmented region after copying operation is arranged at the position of the block b0063 in the lower view (707) of FIG. 7D. At this time, padding is inserted into a region corresponding to padding size H=4 pixels from the padding start position (705).

Although padding may be any type of data, the following advantage can be obtained by using the data of region A of the superimposed region 706. That is, when random access is made to a block b0062 in the lower view of FIG. 7D, using the data of region A as padding obviates the necessity to read out a block b0063 regardless of the movement of the original data (region A) to b0063. The same applies to processing in the V direction.

FIG. 8C shows a data arrangement in the line buffer 306 after the padding position is moved in the V direction. The upper view (807) of FIG. 8C shows a data arrangement in the line buffer when blocks b3000 to b3031 are generated from lines #240 to #247. The lower view (808) of FIG. 8C shows a data arrangement in the line buffer when blocks b3100 to b3131 are generated from lines #248 to #251. In the case of the V direction, the start position of a superimposed region block becomes the start position (805) of superimposed region A stored in the line buffer 306. The block generation unit 307 copies the data (806) of the superimposed region block to the position shifted from the start position by the padding size V (four lines). After the copying operation, as shown in the lower view (808) of FIG. 8C, the superimposed region (806) is arranged from the upper end of the blocks b3100 to b3131. At this time, padding is inserted from the padding start position (805) by an amount corresponding to the padding size V (four lines).

As described above, the image processing apparatus according to this embodiment rearranges a superimposed region which lies astride two blocks to one block by changing the padding position. When generating block data, the image processing apparatus according to the embodiment can reduce the number of blocks to read out a superimposed region by changing the padding position at the time of next processing for adjacent segmented images by the filter image processing unit.

If there is still processing to be performed for one segmented image input from the scaler 204 (NO in step S509) after the generation of block data from the entire data in the line buffer 306, the block generation unit 307 performs block generation processing for the line data to be received next from step S502 in the same manner as described above. If all the processing for the one segmented image input from the scaler 204 is complete (YES in step S509), block generation is performed for the line data of the next segmented image from step S500 in the same manner as described above.

Figure 6:
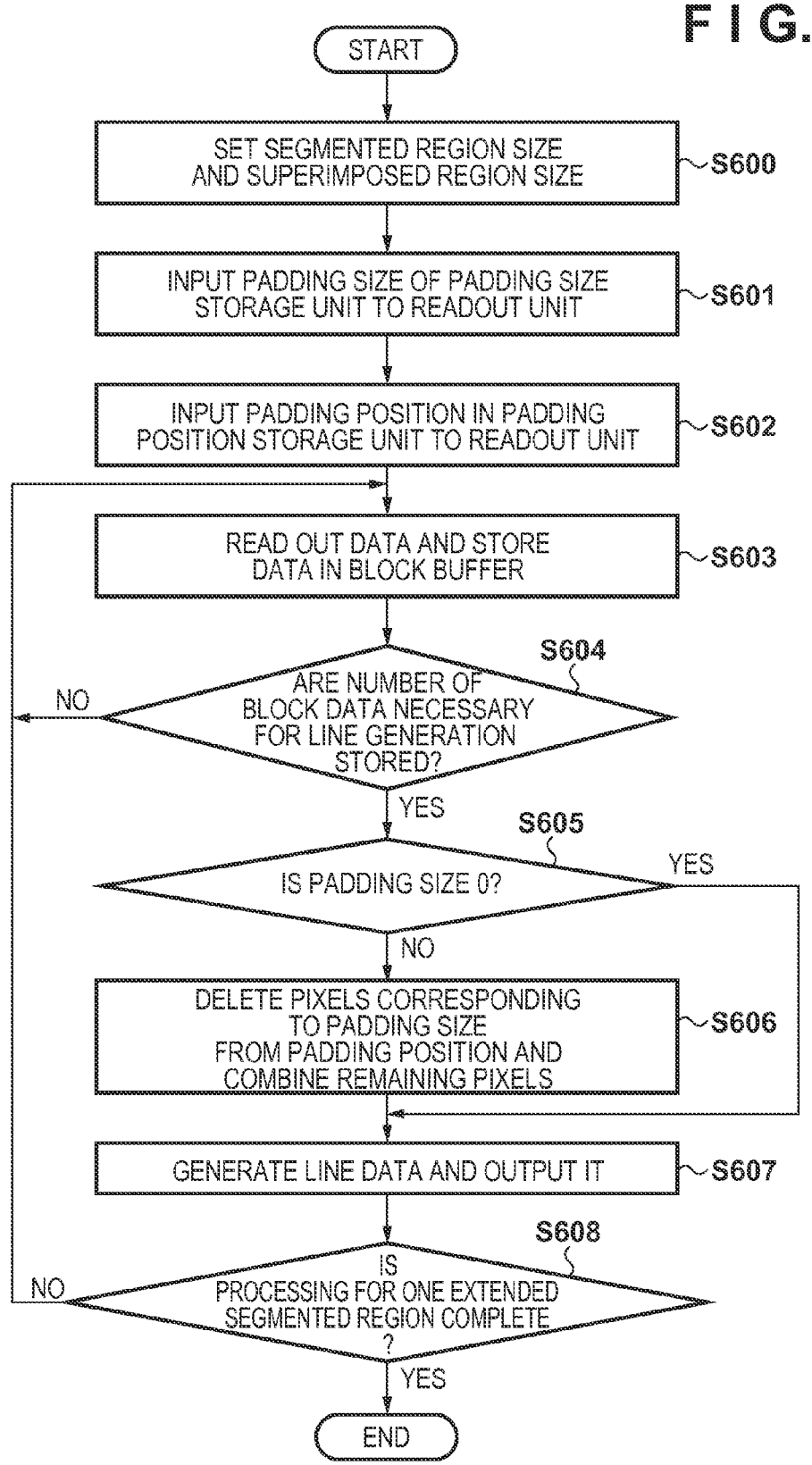
FIG. 6 is an operation flowchart at the time of padding deletion.

FIG. 6 is an operation flowchart for padding deletion control by the second control unit 101B and padding deletion by the readout unit 102. A segmented region size and a superimposed region size are set in the respective registers before the start of data readout by the readout unit 102 (step S600). The processing unit 100 links the padding position and padding size generated at the time of processing for a segmented image to the ID of the segmented region and respectively stores them in the padding size storage unit 308 and the padding position storage unit 309 of the second control unit 101B. The second control unit 101B inputs the padding size and the padding position linked to the segmented image ID corresponding to the readout extended segmented image to the readout unit 102 (steps S601 and S602).

The readout unit 102 reads out an extended segmented image from the memory, and stores the decompressed block data in the block buffer (step S603). The second control unit 101B detects that block data necessary for line generation, that is, blocks of the extended segmented image in the H direction, is stored in the block buffer 313 (YES in step S604). If a necessary number of blocks are not stored (NO in step S604), a data readout operation in step S603 is performed. The readout unit 102 refers to the padding size input from the second control unit 101B. If the padding size is 0 (YES in step S605), since there is no need to delete padding, line data is generated from data in the block buffer and input to the filter image processing unit (step S607). If the padding size is not 0 (NO in step S605), the padding position input from the second control unit 101B is referred to, pixels corresponding to the padding size are deleted from the padding position, and line data is generated by combining the remaining pixels (steps S606 and S607).

FIGS. 9A and 9B each show a data arrangement in the block buffer 313 at the time of padding deletion processing in the H direction. At the time of filter image processing, the readout unit 102 reads out an extended segmented image. A data arrangement 900 in FIG. 9A is a data arrangement in the block buffer when the extended segmented image (400 and 401) shown in FIG. 4C is read out. Each filled region indicates the effective pixels of a segmented image. In addition, the hatched portion indicates the superimposed region read out from an adjacent image. The block data read out from the readout unit 102 includes the padding (702) and (708) generated by the processing unit 100. The line generation unit 312 of the readout unit 102 deletes the padding (702) in accordance with the padding position (pixel #252) and the size (four pixels) of segmented image 0. In addition, the line generation unit 312 deletes the padding (708) in accordance with the padding position (pixel #244) and the size (four pixels) of segmented image 1. The line generation unit 312 generates line data from the block data by combining the remaining pixels after the deletion of the padding. FIG. 9B shows a data arrangement 901 of the block buffer after processing. The line generation unit 312 also deletes padding in the V direction in the same manner as in padding deletion processing in the H direction.

If there is still processing to be performed for one extended segmented image read out from the readout unit 102 (NO in step S608) after the generation of line data from the entire data in the block buffer by the line generation unit 312, the line generation unit 312 performs line generation for the block data to be read out next from step S603 in the same manner as described above. If all the processing for the one extended segmented image read out from the readout unit 102 is complete (YES in step S608), block generation is performed for the block data of the next extended segmented image from step S600 in the same manner as described above.

Note that this embodiment is assumed to be applied to reduction processing, but can also be applied to enlargement processing. Assume, for example, the processing of enlarging an input image into an image having a resolution of 4080×2152, with the resolution of the input image being 2048×1080, the compressed block size being 8 pixels×8 pixels, the segmented region size being 512 pixels×512 pixels, and the extended segmented region size being 520 pixels×520 pixels. In this case, when reading out a segmented region, the scaler 204 reads out a segmented image such that data after enlargement does not exceed the buffer having a size corresponding to the segmented region H of the scaler 204. The scaler 204 reads out 256×256, and inputs the line data of the image enlarged to 510×510 to the processing unit 100. FIGS. 10A and 10B each show a data arrangement (in the H direction) in the line buffer 306 in this case. At this time, padding is inserted after pixel #510 located in the block b0064. In this case, the effective region block count is 64 and the superimposed region block count is 1, and hence the sum exceeds 64, which is the segmented image block count. For this reason, the padding position determination unit 302 determines that the padding exists in the superimposed region (FIG. 10A). The subsequent operation procedure is the same as in the case of reduction processing (FIG. 10B).

As described above, in this embodiment, when the first segmented image is not n times the compressed block size, a superimposed region in the first segmented image read out at the time of processing for the second segmented image is specified. For this reason, it is possible to generate padding at a position at which the number of compressed blocks including the superimposed regions read out at the time of processing for the second segmented image does not increase. As a result, it is not necessary to increase the compressed block count at the time of superimposed region readout, and hence the band (the data amount of image data to be read out for image processing) can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182503, filed Sep. 8, 2014, which is hereby incorporated by reference herein in its entirety.

What is claimed is:

1. An image processing apparatus comprising:
an inputter for inputting an image;
a reader for reading out, from a memory, to perform image processing for an image of a second region of the input image, an image of the second region and an image of a part of a first region adjacent to the second region; and
a controller for controlling a position of padding in the memory, wherein the padding results from image reduction of the first region, which is performed before the image processing for the image of the second region, so that the padding that results from the image reduction of the first region is not read out by the reader for the image processing for the image of the second region.

2. The apparatus according to claim 1, wherein the controller determines a size of the padding resulting from the image reduction of the first region and determines a change amount of the position of the padding in accordance with the determined size of the padding and a size of the first region used by the image processing for the image of the second region, and
wherein the controller changes the position of the padding based on the determined change amount.

3. The apparatus according to claim 1, wherein the first region and the second region each comprise a partial region of the input image, and padding further results from an enlargement of the first region of the input image.

4. The apparatus according to claim 2, wherein
the image processing is performed upon reading out the input image from the memory for each block, the memory including a block size register configured to store a size of the block; a segmented image size register configured to store, as segmented image sizes, sizes of the first region and the second region; a superimposed region size register configured to store, as a superimposed region size, a size of the first region to be used for the image processing for the image of the second region; and an effective region size register configured to store, as an effective region size, a size of a partial region after image processing for the first region, and the controller determines a size of padding such that a size obtained after adding padding to the effective region size becomes an integer that is a multiple of a size of the block, and determines a change amount of the position of the padding based on the size of the padding and the superimposed region size.

5. An image processing method comprising:

inputting an image;

reading out, from a memory, to perform image processing for an image of a second region of the input image, an image of the second region and an image of a part of a first region adjacent to the second region; and controlling a position of padding in the memory, wherein the padding results from image reduction of the first region, performed before the image processing for the image of the second region, so that the padding that results from the image reduction of the first region is not read out for the image processing for the image of the second region.

6. The method according to claim 5, wherein, in the controlling, a size of the padding occurred by the image reduction of the first region is determined, and a change amount of the position of the padding in accordance with the determined size of the padding and a size of the first region used by the image processing for the image of the second partial region are determined, wherein in the controlling, the position of the padding is changed based on the determined change amount.

7. The method according to claim 5, wherein the first region and the second region each comprise a partial region of the input image, and padding further results from an enlargement of the first region of the input image.

8. A non-transitory computer-readable storage medium storing a program which causes a computer to:

read out, from a memory, to perform image processing for an image of a second region of the input image, an image of the second region and an image of a part of a first region adjacent to the second region; and control a position of padding in the memory, wherein the padding results from image reduction of the first region, performed before the image processing for the image of the second region, so that the padding that results from the image reduction of the first region is not read out for the image processing for the image of the second region.

* * * * *